(12) United States Patent
Koyabu et al.

(10) Patent No.: US 7,729,591 B2
(45) Date of Patent: Jun. 1, 2010

(54) DATA PROCESSING APPARATUS, REPRODUCTION APPARATUS, DATA PROCESSING SYSTEM, REPRODUCTION METHOD, PROGRAM, AND STORAGE MEDIUM

(75) Inventors: Kyohei Koyabu, Kanagawa (JP); Shojiro Shibata, Kanagawa (JP); Shuji Tsunashima, Tokyo (JP); Mototsugu Takamura, Kanagawa (JP); Shinjiro Kakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1257 days.

(21) Appl. No.: 11/253,663

(22) Filed: Oct. 20, 2005

(65) Prior Publication Data

US 2006/0088278 A1    Apr. 27, 2006

(30) Foreign Application Priority Data

Oct. 26, 2004  (JP) ............................ P2004-311595
Aug. 24, 2005  (JP) ............................ P2005-243291

(51) Int. Cl.
*H04N 5/91* (2006.01)
(52) U.S. Cl. .......................................... 386/68; 386/46
(58) Field of Classification Search ............... 386/68, 386/46
See application file for complete search history.

(56) References Cited

U.S. PATENT DOCUMENTS 4,558,377 A * 12/1985 Collins et al. ................. 386/77
2005/0175314 A1 * 8/2005 Hu ................................ 386/1

FOREIGN PATENT DOCUMENTS

| JP | 8-223538 | 8/1996 |
| JP | 2000-83215 | 3/2000 |
| JP | 2002-218396 | 8/2002 |

* cited by examiner

*Primary Examiner*—Marsha D Banks Harold
*Assistant Examiner*—Asher Khan
(74) *Attorney, Agent, or Firm*—Oblon, Spivak, McClelland, Maier & Neustadt, L.L.P.

(57) ABSTRACT

A data processing apparatus outputting picture data to a reproduction apparatus reproducing a plurality of picture data in an order in accordance with a designated reproduction direction, the unit having a processing circuit outputting to the reproduction apparatus the picture data in an order in accordance with a reproduction direction designated in the reproduction apparatus and writing it into an input memory in the reproduction apparatus and, when reversing the reproduction direction designated at the reproduction apparatus, outputting the picture data to the reproduction apparatus conditional on the picture data to be used next in reproduction by the reproduction direction after reversal not being stored in the input memory.

15 Claims, 12 Drawing Sheets

4a

DATA PROCESSING APPARATUS, REPRODUCTION APPARATUS, DATA PROCESSING SYSTEM, REPRODUCTION METHOD, PROGRAM, AND STORAGE MEDIUM

CROSS REFERENCES TO RELATED APPLICATIONS

The present invention contains subject matter related to Japanese Patent Applications No.2004-311595 filed on Oct. 26, 2004 and No.2005-243291 filed on Aug. 24, 2005 in the Japan Patent Office, the entire contents of which being incorporated herein by reference.

BACKGROUND OF THE INVENTION

1. Field of Invention

The present invention relates to a data processing apparatus for reproducing data for reproduction, a reproduction apparatus, a data processing system, a reproduction method, a program, and a storage medium.

2. Description of the Related Art

For example, there is a system which outputs data for reproduction encoded by the MPEG (Moving Picture Experts Group) scheme from a computer (data processing apparatus) to a reproduction apparatus for reproduction. In such a system, the computer successively outputs to the reproduction apparatus the picture data required for reproduction from among the plurality of picture data forming the reproduced data in accordance with the progress in reproduction by the reproduction apparatus. In this system, if a transient command reversing the reproduction direction arises, the computer unconditionally outputs the picture data reproduced after the transient without judging if the picture data is stored in the reproduction apparatus. See Japanese Patent Publication (A) No. 2004-215185.

However, in the above related system, when a transient command occurs, processing for transferring the picture data used for reproduction after the transient from the computer to the reproduction apparatus inevitably arises, so there is the disadvantage of a long time ending up being taken from when the transient command arises to when the reproduced output after the transient is obtained in the reproduction apparatus. That is, there is the disadvantage of a poor response of the transient reproduction. Further, in the processing for reproduction of picture data, there are demands for lightening the processing load on the reproduction apparatus.

SUMMARY OF THE INVENTION

An object of the present invention is to provide a data processing apparatus, reproduction apparatus, data processing system, reproduction method, program, and storage medium able to shorten the time from when a command for reversal of the reproduction direction occurs to when the reproduced output after reversal is obtained at a reproduction apparatus compared with the past when outputting picture data for reproduction from a data processing apparatus to a reproduction apparatus.

Another object of the present invention is to provide a data processing apparatus, data processing system, reproduction method, program, and storage medium able to lighten the processing load of a reproduction apparatus.

To achieve the above objects, according to a first aspect of the invention, there is provided a data processing apparatus outputting picture data to a reproduction apparatus reproducing a plurality of picture data in an order in accordance with a designated reproduction direction, the data processing apparatus comprising a processing circuit outputting to the reproduction apparatus the picture data in an order in accordance with a reproduction direction designated in the reproduction apparatus and writing it into an input memory in the reproduction apparatus and, when reversing the reproduction direction designated at the reproduction apparatus, outputting the picture data to the reproduction apparatus conditional on the picture data to be used next in reproduction by the reproduction direction after reversal not being stored in the input memory.

The action of the first aspect of the invention is as follows. The processing circuit outputs to the reproduction apparatus the picture data in an order in accordance with a reproduction direction designated in the reproduction apparatus and writes it into an input memory in the reproduction apparatus. When reversing the reproduction direction designated at the reproduction apparatus, the processing circuit outputs the picture data to the reproduction apparatus conditional on the picture data to be used next in reproduction by the reproduction direction after reversal not being stored in the input memory.

According to a second aspect of the invention, there is provided a reproduction apparatus successively decoding and reproducing a plurality of data input from a source of data output, comprising an input means for inputting the picture data in an order in accordance with the reproduction direction from the source of data output, an input memory for storing the picture data, a reproduction circuit for decoding and reproducing the picture data read from the input memory, and a processing circuit for writing the picture data which the input means inputs over at least part of the picture data in the picture data already finished being reproduced stored in the input memory and outputting the picture data read from the input memory in accordance with the reproduction direction to the reproduction circuit, the processing circuit, when receiving as input a reversal command of the reproduction direction from the source of data output, reading the picture data already reproduced at the reproduction circuit from the input memory and outputting it to the reproduction circuit for reproduction after reversal.

The action of the second aspect of the invention is as follows: The input means inputs the picture data in an order in accordance with the reproduction direction from a source of data output. Further, the processing circuit writes the picture data which the input means inputs into an input memory. The processing circuit reads the picture data from the input memory and outputs it to the reproduction circuit. Further, the reproduction circuit decodes the input picture data. At this time, when receiving a reversal command of the reproduction direction from the source of data output, the processing circuit reads the picture data already reproduced at the reproduction circuit from the input memory and outputs it to the reproduction circuit.

According to a third aspect of the invention, there is provided a data processing system having a data processing apparatus outputting a plurality of picture data to a reproduction apparatus for reproduction, provided with a data processing apparatus outputting the picture data to the reproduction apparatus in an order in accordance with a reproduction direction designated at the reproduction apparatus and writing it into an input memory in the reproduction apparatus and, when reversing the reproduction direction designated at the reproduction apparatus, outputting the picture data to the reproduction apparatus conditional on the picture data to be used next in reproduction by the reproduction direction after reversal not being stored in the input memory, and a reproduction apparatus writing the picture data input from the data processing apparatus into the input memory and reproducing the picture data read from the input means in accordance with a reproduction direction designated by the data processing apparatus.

According to a fourth aspect of the invention, there is provided a reproduction method for outputting a plurality of picture data from a data processing apparatus to a reproduction apparatus, comprising a first step of having the data processing apparatus judge, when reversing the reproduction direction designated at the reproduction apparatus, whether the picture data to be used next in reproduction in the reproduction direction after reversal is held by the reproduction apparatus and a second step of having the data processing apparatus output the picture data to the reproduction apparatus conditional on it being judged at the first step that the picture data to be used next in reproduction is not held in the reproduction apparatus.

According to a fifth aspect of the invention, there is provided a program executed by a data processing apparatus outputting a plurality of picture data to a reproduction apparatus reproducing that picture data in an order in accordance with a designated reproduction direction, comprising a first routine of outputting to the reproduction apparatus the picture data in an order in accordance with a reproduction direction designated at the reproduction apparatus and writing it into an input memory in the reproduction apparatus and a second routine of, when reversing the reproduction direction designated at the reproduction apparatus, outputting the picture data to the reproduction apparatus conditional on the picture data to be used next in reproduction in the reproduction direction after reversal not being stored in the input memory.

According to a sixth aspect of the invention, there is provided a storage medium storing a program executed by a data processing apparatus outputting a plurality of picture data to a reproduction apparatus reproducing that picture data in an order in accordance with a designated reproduction direction, the program comprising a first routine of outputting to the reproduction apparatus the picture data in an order in accordance with a reproduction direction designated at the reproduction apparatus and writing it into an input memory in the reproduction apparatus and a second routine of, when reversing the reproduction direction designated at the reproduction apparatus, outputting the picture data to the reproduction apparatus conditional on the picture data to be used next in reproduction in the reproduction direction after reversal not being stored in the input memory.

According to a seventh aspect of the invention, there is provided a program executed by a reproduction apparatus for outputting a plurality of picture data from a data processing apparatus to the reproduction apparatus for reproduction, comprising a first routine of having the data processing apparatus judge, when reversing the reproduction direction designated at the reproduction apparatus, whether the picture data to be used next in reproduction in the reproduction direction after reversal is held by the reproduction apparatus and a second routine of having the data processing apparatus output the picture data to the reproduction apparatus conditional on it being judged at the first routine that the picture data to be used next in reproduction is not held in the reproduction apparatus.

According to an eighth aspect of the invention, there is provided a storage medium storing a program executed by a reproduction apparatus for outputting a plurality of picture data from a data processing apparatus to the reproduction apparatus for reproduction, the program comprising a first routine of having the data processing apparatus judge, when reversing the reproduction direction designated at the reproduction apparatus, whether the picture data to be used next in reproduction in the reproduction direction after reversal is held by the reproduction apparatus and a second routine of having the data processing apparatus output the picture data to the reproduction apparatus conditional on it being judged at the first routine that the picture data to be used next in reproduction is not held in the reproduction apparatus.

According to a ninth aspect of the invention, there is provided a data processing apparatus having a data processing means for outputting a plurality of picture data to a reproducing means for reproduction, comprising a data processing means for outputting the picture data to the reproducing means in an order in accordance with a reproduction direction designated at the reproducing means and writing it into an input memory in the reproducing means and, when reversing the reproduction direction designated at the reproducing means, outputting the picture data to the reproducing means conditional on it being judged that the picture data to be used next in reproduction in the reproduction direction after reversal is not stored in the input memory and a reproducing means for writing the picture data input from the data processing means into the input memory and reproducing the picture data read from the input memory in accordance with a reproduction direction designated by the data processing means.

According to a 10th aspect of the invention, there is provided a data processing apparatus outputting a plurality of picture data to a reproduction apparatus reproducing the picture data in order in a designated reproduction direction, comprising a processing circuit outputting the picture data to be reproduced by the reproduction apparatus to the reproduction apparatus before reproduction and writing it in an input memory in the reproduction apparatus, then managing a timing of making the reproduction apparatus reproduce the picture data written in the input memory, and outputting to the reproduction apparatus a command to reproduce the read picture data in accordance with the management.

According to an 11th aspect of the invention, there is provided a program executed by a data processing apparatus outputting a plurality of picture data to a reproduction apparatus reproducing that picture data in an order in accordance with a designated reproduction direction, comprising a first routine of outputting the picture data to be reproduced by the reproduction apparatus to the reproduction apparatus before reproduction and writing it in an input memory in the reproduction apparatus and a second routine of managing a timing of making the reproduction apparatus reproduce the picture data written in the input memory and outputting to the reproduction apparatus a command to reproduce the read picture data in accordance with the management.

According to a 12th aspect of the invention, there is a provided a storage medium storing a program executed by a data processing apparatus outputting a plurality of picture data to a reproduction apparatus reproducing that picture data in an order in accordance with a designated reproduction direction, the program comprising a first routine of outputting the picture data to be reproduced by the reproduction apparatus to the reproduction apparatus before reproduction and writing it in an input memory in the reproduction apparatus and a second routine of managing a timing of making the reproduction apparatus reproduce the picture data written in the input memory and outputting to the reproduction apparatus a command to reproduce the read picture data in accordance with the management.

According to a 13th aspect of the invention, there is provided a data processing system having a data processing apparatus outputting a plurality of picture data to a reproduction apparatus for reproduction, comprising a data processing apparatus outputting the picture data to the reproduction apparatus before its reproduction and writing it in an input memory in the reproduction apparatus, then managing a timing for making the reproduction apparatus reproduce the picture data written in the input memory and outputting a command to reproduce the read picture data in accordance with the management to the reproduction apparatus and a reproduction apparatus provided with the input memory, writing picture data input from the data processing apparatus into the input memory, and, when receiving the command from the data processing apparatus, reading and reproducing picture data designated by the command from the input memory.

According to a 14th aspect of the invention, there is provided a reproduction method having a data processing apparatus output a plurality of picture data to a reproduction apparatus for reproduction, comprising a first step of having a data processing apparatus output the picture data to the reproduction apparatus before its reproduction and write it in an input memory in the reproduction apparatus, then manage a timing for making the reproduction apparatus reproduce the picture data written in the input memory, a second step of having the data processing apparatus output a command to reproduce the read picture data in accordance with the management to the reproduction apparatus, and a third step of having the reproduction apparatus read and reproduce picture data designated by the command from the input memory in accordance with the command input at the second step.

According to the first to ninth aspects of the invention, it is possible to provide a data processing apparatus, reproduction apparatus, data processing system, reproduction method, program, and storage medium able to shorten the time from when a command for reversal of the reproduction direction occurs to when the reproduced output after reversal is obtained at a reproduction apparatus compared with the past when outputting picture data for reproduction from a processing unit to a reproduction apparatus.

Further, according to the 10th to 14th aspects of the invention, it is possible to provide a data processing apparatus, data processing system, reproduction method, program, and storage medium able to lighten the processing load of the reproduction apparatus.

BRIEF DESCRIPTION OF THE DRAWINGS

These and other objects and features of the present invention will become clearer from the following description of the preferred embodiments given with reference to the attached drawings, wherein.

BEST MODE FOR WORKING THE INVENTION

Below, data processing systems according to embodiments of the present invention will be explained.

First Embodiment

Figure 1:
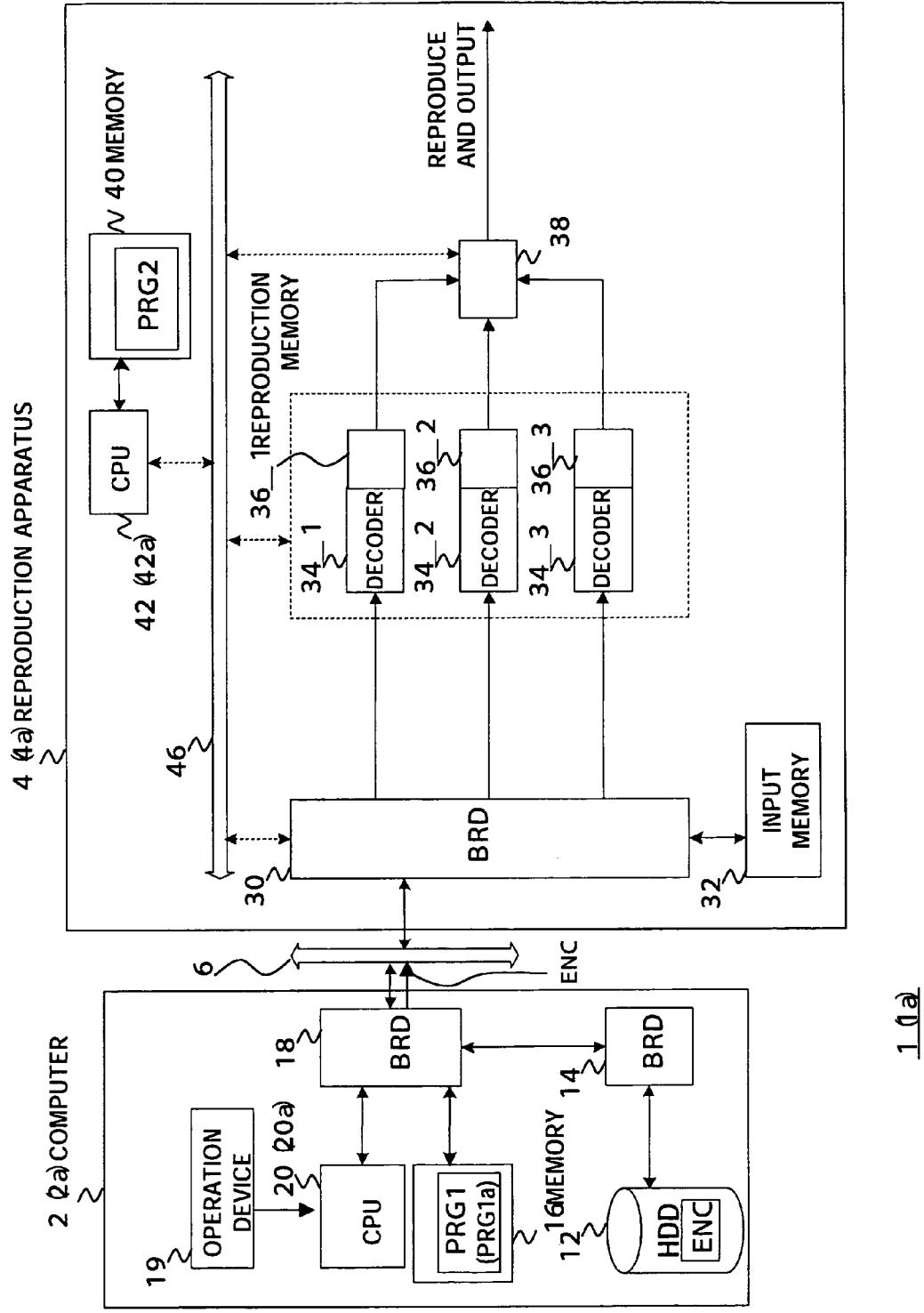
FIG. 1 is a view of the overall configuration of a data processing system according to an embodiment of the present invention.

FIG. 1 is a view of the overall configuration of a data processing system 1 according to an embodiment of the present invention. As shown in FIG. 1, a data processing system 1 has for example a computer 2 and a reproduction apparatus 4.

[Computer 2]

As shown in FIG. 1, the computer 2 has an HDD 12, a bridge 14, a memory 16, a bridge 18, operation device 19, and a CPU 20. Note that the memory 16 stores a predetermined program PRG1 (program of the fifth aspect of the invention), while the CPU 20 reads out and executes the program to perform the following processing. The predetermined program may be stored in a semiconductor memory or other memory 16 or stored on an HDD, optical disk, or other storage medium.

Figure 2:
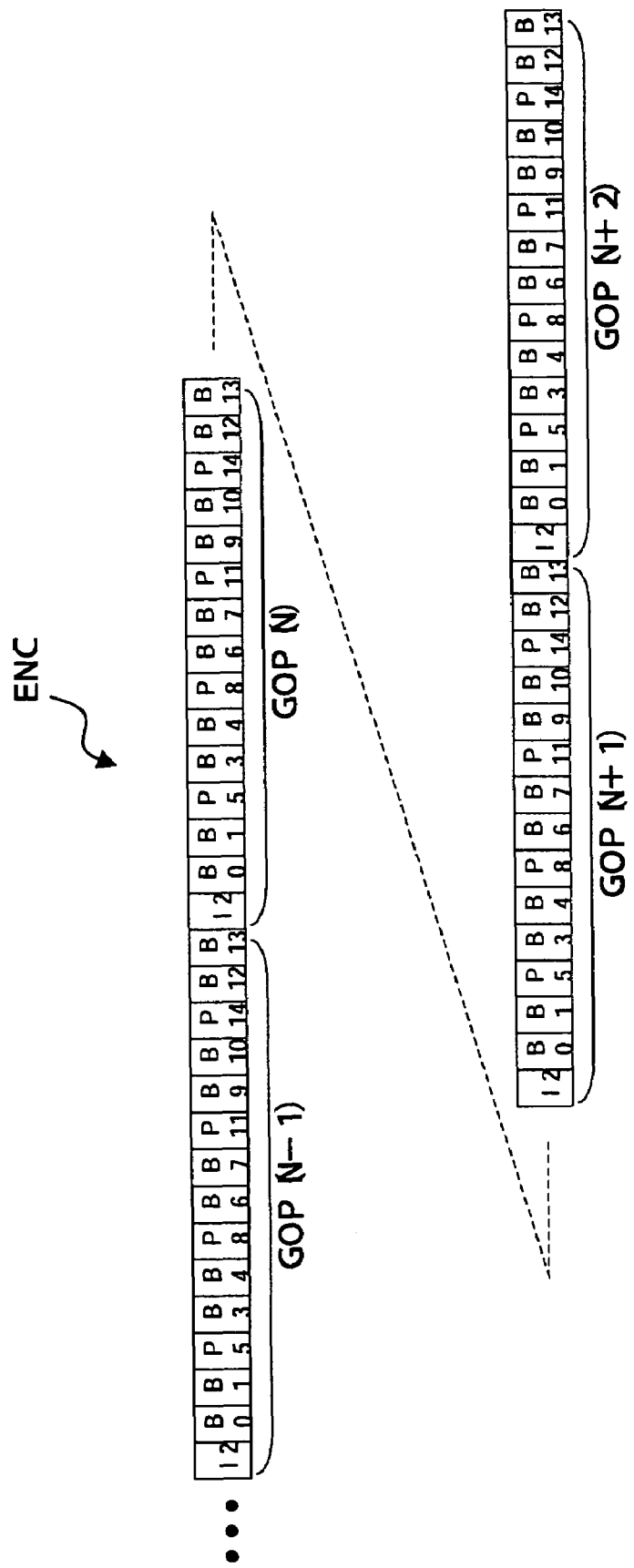
FIG. 2 is a view for explaining reproduced data ENC to be decoded by the data processing system shown in FIG. 1.

The HDD 12 for example stores reproduced data ENC encoded by the MPEG scheme. The reproduced data ENC, as shown in FIG. 2, is comprised of a plurality of GOP (Groups Of Pictures) successively decoded at the reproduction apparatus 4. In the example shown in FIG. 2, it is decoded in the order of GOP(N−1), (N), (N+1), (N+2). Each GOP is comprised of I, P, and B picture data (frame data). Further, each GOP includes a single I picture data. In the present embodiment, for example, a so-called "long GOP" with a relatively large number of picture data in the GOP is used.

The I picture data is picture data of an intra- (in-frame) encoded image and is decoded independently from other picture data. Further, the P picture data is picture data of the frame predictively encoded in the forward direction and is decoded with reference to the I or P picture data positioned time-wise in the past (previous display order). Note that the "I and P picture data" is also referred to as the "anchor picture data". Further, the B picture data is picture data of the frame predictively encoded in two directions and is decoded while referring to the I or P picture data positioned time-wise in front or in back (display order in front or back). Note that the read rate of the HDD 12 is slower than the maximum reproduction rate of the reproduction apparatus 4.

The bridge 14 provides an expansion function of the bridge 18 and is provided with a PCI expansion slot or IDE (Integrated Drive Electronics) slot etc. The bridge 14 basically has the same functions as the bridge 18, but has a narrower bandwidth than the bridge 18 and has lower speed access devices than the devices connected to the bridge 18 connected to it.

The memory 16 is for example a semiconductor memory and stores the programs and data used for the processing by the CPU 20. The operation device 19 is a keyboard, mouse, or other operating means and outputs an operation signal corresponding to user operations to the CPU 20. The operation device 19 receives an operation for designating a reproduction point of the reproduced data ENC, an operation for issuing a reproduction start command of the designated reproduction point, and a transient command operation in accordance with user operations based on a not shown operation screen and outputs an operation signal showing the same to the CPU 20. The bridge 18 has the bridge 14, memory 16, PCI bus 6, and CPU 20 connected to it and converts data along with transfer through the CPU 20 address bus and data bus.

Figure 3:
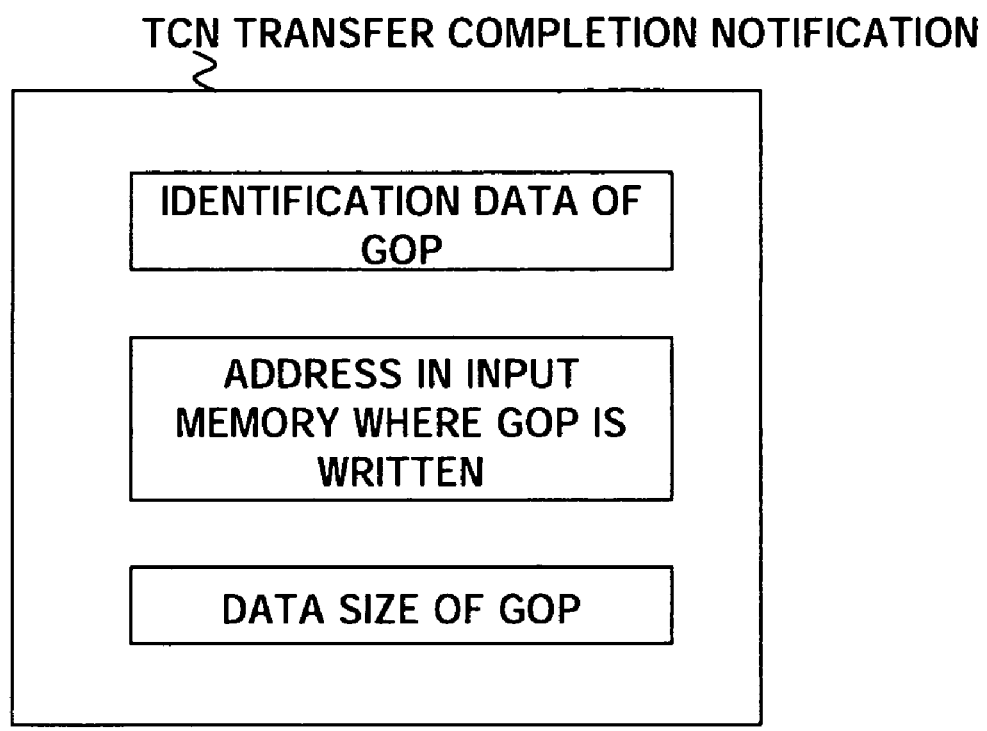
FIG. 3 is a view for explaining a transfer completion notification output from the computer shown in FIG. 1 to a reproduction apparatus.

The CPU 20, for example, executes a program read from the memory 16 to control the operation of the computer 2. When the CPU 20 receives an operation signal from the operation device 19 indicating the operation for designating a reproduction point, it reads the GOP including the picture data of the designated reproduction point from the HDD 12 and outputs (transfers) it through the bridge 18 and PCI bus 6 to the reproduction apparatus 4. Further, the CPU 20 successively reads GOPs from the HDD 12 in accordance with the state of progress in reproduction by the reproduction apparatus 4 and outputs the results to the reproduction apparatus 4. Further, the CPU 20 outputs the transfer completion notification TCN of the CPU 42 of the reproduction apparatus 4 linked with the output of the GOP to the reproduction apparatus 4. The transfer completion notification TCN, as shown in FIG. 3, shows the identification data of the GOP output (transferred) from the computer 2 to the reproduction apparatus 4, the address in the input memory 32 where the GOP is written, and the size of the data of the GOP. Further, the transfer completion notification shows the identification data of each picture data in the output GOP, the address in the input memory 32 where the picture data is written, and the size of the picture data. Further, when the CPU 20 receives an operation signal indicating a reproduction start command operation from the operation device 19, it outputs a reproduction start command designating a reproduction point through the bridge 18 and PCI bus 6 to the reproduction apparatus 4.

Further, when the CPU 20 receives as input an operation signal indicating a transient command operation from the operation device 19, it outputs that transient command through the bridge 18 and PCI bus 6 to the reproduction apparatus 4. Further, when the CPU 20 receives as input an operation signal indicating a transient command operation, it judges if a GOP including the picture data to be used next in reproduction in the reproduction direction after the transient is stored in the input memory 32 and outputs the GOP to the reproduction apparatus 4 conditional on it being judged that it is not stored. On the other hand, when the CPU 20 judges that the GOP is stored in the input memory 32, it does not output the GOP to the reproduction apparatus 4, but outputs the transfer completion notification of the GOP to the CPU 42 of the reproduction apparatus 4. The CPU 20 manages the GOPs and picture data stored in the input memory 32 of the reproduction apparatus 4 based on the transfer completion notification, transient command, reproduction speed command, etc. output to the reproduction apparatus 4. Due to this, the CPU 20 can judge if the GOP including the picture data to be used next for reproduction in the reproduction direction after the transient is stored in the input memory 32 or not. Further, the CPU 20 determines the address of the GOP to be written next so that as to enable part of the picture data in the picture data already reproduced in the reproduction apparatus 4 in the picture data stored in the picture data input memory 32 to be overwritten.

[Reproduction Apparatus 4]

As shown in FIG. 1, the reproduction apparatus 4, for example, has a PCI bridge 30, an input memory 32, decoders 34_1 to 34_3, reproduction memories 36_1 to 36_3, a selector 38, a control memory 40, a CPU 42, and a control bus 46. Note that the control memory 40 stores a predetermined program PRG2 (program of the seventh aspect of the present invention) and that the CPU 42 reads and executes that program to perform the following processing. The predetermined program may be stored in a semiconductor memory or other control memory 40 or may be stored on an HDD, optical disk, or other storage medium.

The PCI bridge 30 is provided with a memory for buffering the GOPs and commands input via the PCI bus 6 from the computer 2. Further, the bridge 18 is provided with a dynamic memory access (DMA) transfer function. The input memory 32 is an SDRAM or other semiconductor memory and temporarily stores GOPs input via the PCI bridge 30.

The decoders 34_1, 34_2, and 34_3, under the control of the CPU 42, decode the picture data read out via the PCI bridge 30 from the input memory 32 by the MPEG system and write the results into the reproduction memories 36_1 to 36_3. Specifically, the decoders 34_1, 34_2, and 34_3, under the control of the CPU 42, decode the I picture data read from the input memory 32 without referring to the decoding results of other picture data. Further, the decoders 34_1, 34_2, and 34_3, under the control of the CPU 42, decode the P picture data read from the input memory 32 by referring to the decoding results of the I or P picture data positioned time-wise in the past and already having decoding results stored in the respective reproduction memories 36_1 to 36_3. Further, the decoders 34_1, 34_2, and 34_3, under the control of the CPU 42, decode the B picture data read from the input memory 32 by referring to the decoding results of the I or P picture data positioned time-wise before and after it and already having decoding results stored in the respective reproduction memories 36_1 to 36_3.

When the decoder 34_1, 34_2, and 34_3 receive as input transient commands from the computer 2, then receive as input transfer completion notifications, they do not wait for transfer of GOPs from the computer 2, but read and decode the picture data reproduced after the transient from the input memory 32.

The decoders 34_2 and 34_3 have the same configurations as the decoder 34_1. They decode the image data input via the PCI bridge 30 by the MPEG scheme and write the results in their respective reproduction memories 36_2 and 36_3.

The selector 38, under the control of the CPU 42, switches and selectively reproduces and outputs the decoding results read from the reproduction memories 36_1, 36_2, and 36_3.

The CPU 42 performs the following processing based on the programs and data stored in the control memory 40 so as to control the overall operation of the reproduction apparatus 4. The CPU 42 writes the GOPs input from the computer 2 (reproduced data ENC) to the input memory 32. Further, the CPU 42 performs scheduling for determining the order of decoding the picture data in the GOPs in units of GOPs for the reproduced data ENC stored in the input memory 32. The CPU 42 makes the following decoding be executed at the decoders 34_1, 34_2, and 34_3 based on the results of the scheduling.

The CPU 42 reads the picture data from the input memory 32 and outputs it to the decoders 34_1, 34_2, and 34_3 so that the I, P picture data belonging to the same GOP and the B picture data referring to the decoding results of the I, P picture data are decoded by the same decoders 34_1, 34_2, and 34_3.

The CPU 42 for example reads out the I, P picture data in the GOP(N−1) and the B picture data in the GOP(N) decoded with reference to the decoding results of the I, P picture data through the PCI bridge 30 from the input memory 32 and outputs them to the decoder 34_1. Here, in the present embodiment, an open GOP decoded with reference to the decoding results of the I, P picture data of a GOP with different B picture data is referred to. Specifically, for example, the B0, B1 picture data in the GOP(N) shown in FIG. 2 is decoded with reference to the decoding results of the I, P picture data in the GOP(N−1). Therefore, the CPU 42 outputs the B0, B1 picture data in the GOP(N) to the decoder 34_1.

Further, the CPU 42 for example reads out the I, P picture data in the GOP(N) and the B picture data in the GOP(N+1) decoded by referring to the decoding results of the I, P picture data through the PCI bridge 30 from the input memory 32 and outputs them to the decoder 34_2. Further, the CPU 42 for example reads the I, P picture data in the GOP(N+1) and the B picture data in the GOP(N+2) decoded referring to the decoding results of the I, P picture data through the PCI bridge 30 from the input memory 32 and outputs them to the decoder 34_3.

When for example receiving as input a reproduction start command from the CPU 20 of the computer 2, the CPU 42 makes the decoding of the plurality of GOPs including the reproduction point be performed at the decoders 34_1, 34_2, and 34_3. At this time, the CPU 42 controls the decoding of the B picture data by the decoders 34_1, 34_2, and 34_3, the read operation from the reproduction memories 36_1, 36_2, and 36_3 to the selector 38, and the selection operation of the selector 38 so that reproduction and output are performed at a designated speed in the designated direction from the reproduction point. Further, the CPU 42 manages the addresses of the GOPs and picture data stored in the input memory 32 based on the transfer completion notifications input from the CPU 20.

Below, examples of operation of the data processing system 1 shown in FIG. 1 will be explained.

[First Example of Operation]

Figure 4:
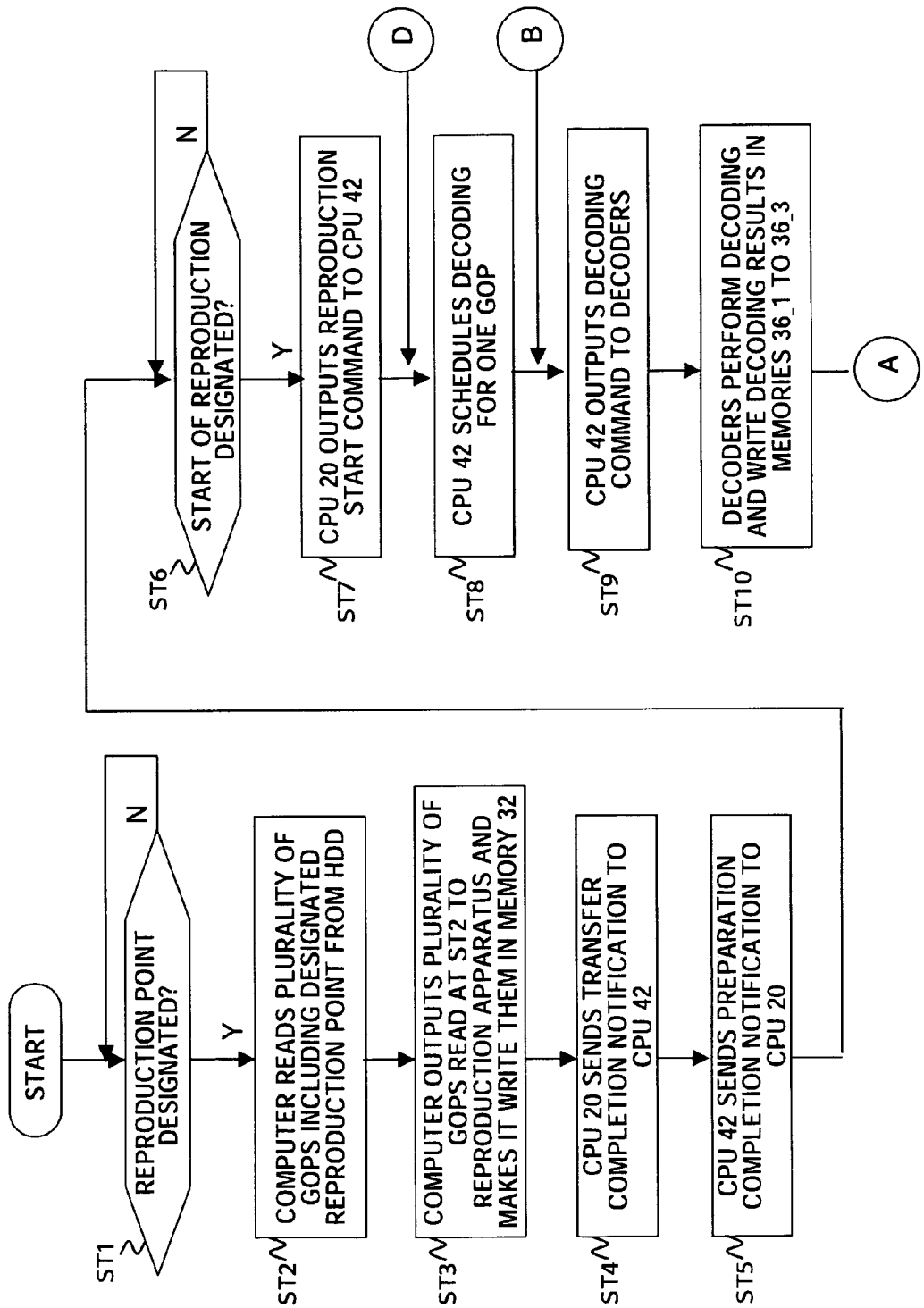
FIG. 4 is a flow chart for explaining an example of the overall operation of the data processing system shown in FIG. 1.
Figure 5:
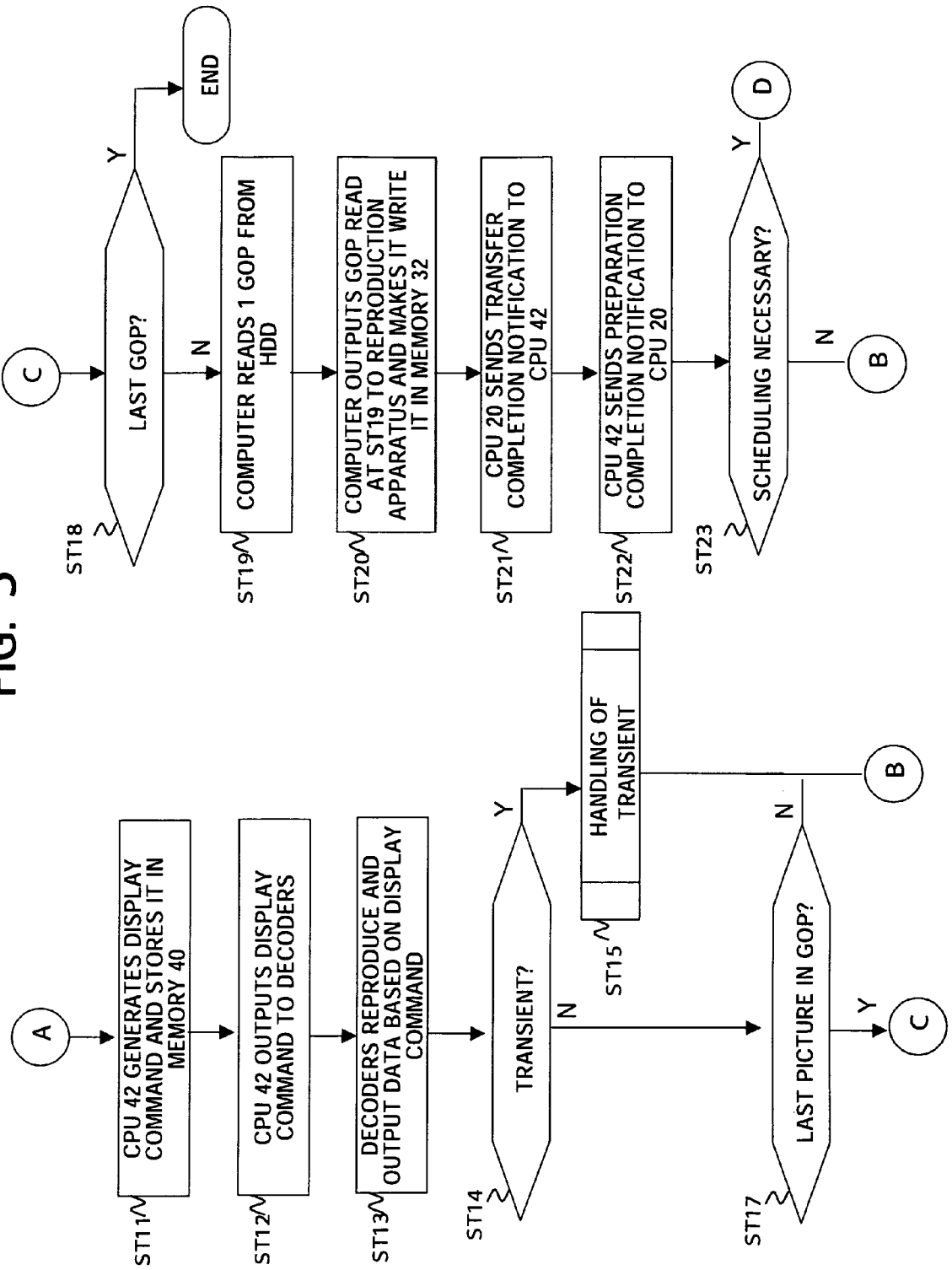
FIG. 5 is a flow chart following FIG. 4 for explaining an example of the overall operation of the data processing system shown in FIG. 1.

Below, an example of the overall operation of the data processing system 1 will be explained. FIG. 4 and FIG. 5 are flow charts for explaining an example of the overall operation of the data processing system 1 shown in FIG. 1.

Step ST1:

The CPU 20 of the computer 2 judges if an operation signal indicating an operation for designation of a reproduction point in the reproduced data ENC has been input from the operation device 19. It proceeds to step ST2 when judging it has been designated, while repeats the processing of step ST1 when judging it has not.

Step ST2:

The CPU 20 of the computer 2 reads from the HDD 12 the GOP including the picture data of the reproduction point designated at step ST1 and the surrounding GOPs or a total of three (plurality of) GOPs.

Step ST3:

The CPU 20 of the computer 2 outputs the plurality of GOPs read at step ST2 through the bridge 18 and PCI bus 6 to the reproduction apparatus 4. The CPU 42 of the reproduction apparatus 4 writes the GOPs input from the computer 2 through the PCI bridge 30 into the input memory 32.

Step ST4:

The CPU 20 of the computer 2 outputs a transfer completion notification to the CPU 42 of the reproduction apparatus 4. This transfer completion notification shows the identification data of the GOPs output (transferred) at step ST3 from the computer 2 to the reproduction apparatus 4, the addresses in the input memory 32 where the GOPs are written, and the sizes of the data of the GOPs. Further, the transfer completion notification shows the identification data of each picture data in the output GOP, the address in the input memory 32 where the picture data has been written, and the size of the picture data. The CPU 42 writes the transfer completion notification into the control memory 40. In the present embodiment, the CPU 20 and CPU 42 hold the transfer completion notification and, based on transfer completion notification, manage the GOPs stored in the input memory 32.

Step ST5:

The CPU 42 of the reproduction apparatus 4, after finishing the processing of step ST4, outputs a preparation completion notification to the CPU 20 of the computer 2.

Step ST6:

The CPU 20 of the computer 2 judges if an operation signal indicating a reproduction start command operation designating a reproduction point has been input from the operation device 19. It proceeds to step ST7 when judging it has been input, while repeats the processing of step ST6 when judging it has not.

Step ST7:

When judging input, the CPU 20 of the computer 2 outputs a reproduction start command designating a reproduction point to the CPU 42 of the reproduction apparatus 4.

Step ST8:

The CPU 42 of the reproduction apparatus 4 performs scheduling for determining the order of decoding the picture data in a GOP stored in the input memory 32 including picture data of a reproduction point indicated by the reproduction start command input at step ST7 in accordance with the relationship of inter-reference between the picture data and the reproduction direction.

Step ST9:

The CPU 42 of the reproduction apparatus 4 outputs a decode command indicating the picture data to be decoded next based on the results of scheduling of step ST8 or the later explained step ST16 to the decoders 34_1, 34_2, and 34_3.

Step ST10:

The decoders 34_1, 34_2, and 34_3 read and decode the picture data indicated by the decode command input at step ST9 and write the decoding results in the respective reproduction memories 36_1 to 36_3.

Step ST11:

The CPU 42 of the reproduction apparatus 4 specifies the decoding results to be next reproduced and output based on the designated reproduction direction and the scheduling results, generates a display command showing the decoding results and a switching command of the selector 38 for the desired reproduction and output, and writes them in the control memory 40.

Step ST12:

The CPU 42 of the reproduction apparatus 4 outputs the display command generated at step ST11 to the decoders 34_1, 34_2, and 34_3 and outputs the switching command to the selector 38.

Step ST13:

The decoders 34_1, 34_2, and 34_3 read out the decoding results indicated by the display command input at step ST12 from the reproduction memories 36_1 to 36_3 and output them to the selector 38. Further, the selector 38 switches and selectively reproduces and outputs the decoding results input from the decoders 34_1, 34_2, and 34_3 based on the switching command input at step ST12.

Step ST14:

The CPU 20 of the computer 2 proceeds to step ST15 when it judges if an operation signal indicating a transient command operation has been input from the operation device 19, while proceeds to step ST17 when judging it has not.

Step ST15:

The CPU 20 of the computer 2 outputs to the CPU 42 of the reproduction apparatus 4 a transient command (reproduction direction switching command). After the transient command is generated, the CPU 20 and CPU 42 perform processing based on the switched reproduction direction. The processing of step ST15 will be explained in detail later using FIG. 6. The reproduction apparatus 4 performs the processing of steps ST9 to ST15 in picture data units.

Step ST17:

The CPU 20 and CPU 42 judge if the picture data processed at step ST9 to ST15 is the last picture data in the GOP. If judging that it is the last picture data, they proceed to step ST18, while when judging it is not, they return to step ST9 and perform the processing of the next picture data.

Step ST18:

The CPU 20 and CPU 42 judge if the GOP to which the processed picture data belongs is the last GOP in the reproduced data ENC. When judging that it is the last GOP, they end the processing, while when not, they proceed to step ST19.

Step ST19:

The CPU 20 of the computer 2 reads the next GOP from the HDD 12 in accordance with the reproduction direction.

Step ST20:

The CPU 20 of the computer 2 outputs the GOP read at step ST19 through the bridge 18 and PCI bus 6 to the reproduction apparatus 4. The CPU 42 of the reproduction apparatus 4 writes the GOP input from the computer 2 through the PCI bridge 30 to the input memory 32.

Step ST21:

The CPU 20 of the computer 2 outputs a transfer completion notification of the GOP output at step ST20 to the CPU 42 of the reproduction apparatus 4. The CPU 42 writes the transfer completion notification in the control memory 40.

Step ST22:

The CPU 42 of the reproduction apparatus 4, after ending the processing at step ST21, outputs a preparation completion notification to the CPU 20 of the computer 2.

Step ST23

The CPU 42 of the reproduction apparatus 4, for example, judges if the scheduling of the GOP including the picture data of a reproduction point next in accordance with the reproduction direction has been completed or not (that is, if scheduling is required). When judging that scheduling has not been completed, it proceeds to step ST8, while when judging it has, it proceeds to step ST9.

[Second Example of Operation]

Figure 6:
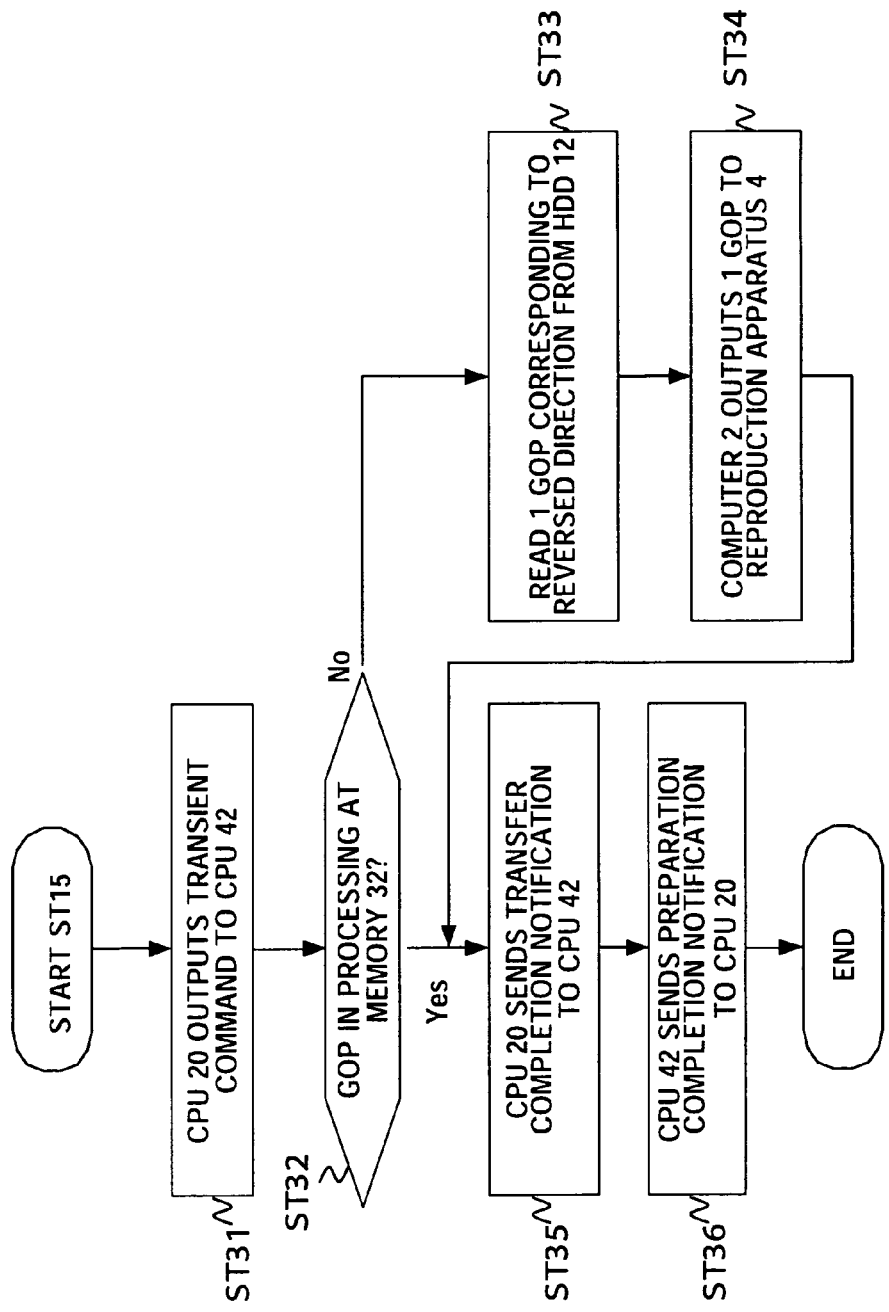
FIG. 6 is a flow chart for explaining the processing of step ST15 of FIG. 5.

Below, the transient processing of step ST15 shown in FIG. 5 will be explained. FIG. 6 is a flow chart for explaining the transient processing of step ST15 shown in FIG. 5.

Step ST31:

When the CPU 20 of the computer 2 receives as input an operation signal indicating a transient command operation from the operation device 19, it outputs the transient command through the bridge 18 and PCI bus 6 to the CPU 42 of the reproduction apparatus 4.

Step ST32:

The CPU 20 of the computer 2 judges if the GOP including the picture data to be used next in reproduction in the reproduction direction after the transient is stored in the input memory 32. When judging it is not stored there, it proceeds to step ST33, while when judging it is stored there, it proceeds to step ST35.

Step ST33:

The CPU 20 of the computer 2 reads from the HDD 12 the picture data to be used next in reproduction in the reproduction direction after the transient.

Step ST34:

The CPU 20 of the computer 2 outputs the GOP read at step ST33 through the PCI bus 6 to the reproduction apparatus 4 and writes the GOP at the predetermined address in the input memory 32.

Step ST35:

The CPU 20 of the computer 2 outputs a transfer completion notification indicating the address in the input memory 32 at which the GOP (picture data) including the picture data to be used next in reproduction in the reproduction direction after the transient is stored to the CPU 42 of the reproduction apparatus 4.

Step ST36:

The CPU 42 of the reproduction apparatus 4 outputs a preparation completion notification to the CPU 20 of the computer 2. Further, the CPU 42 manages the read operation of picture data from the input memory 32 based on the transfer completion notification input at step ST35.

[Third Example of Operation]

Figure 7:
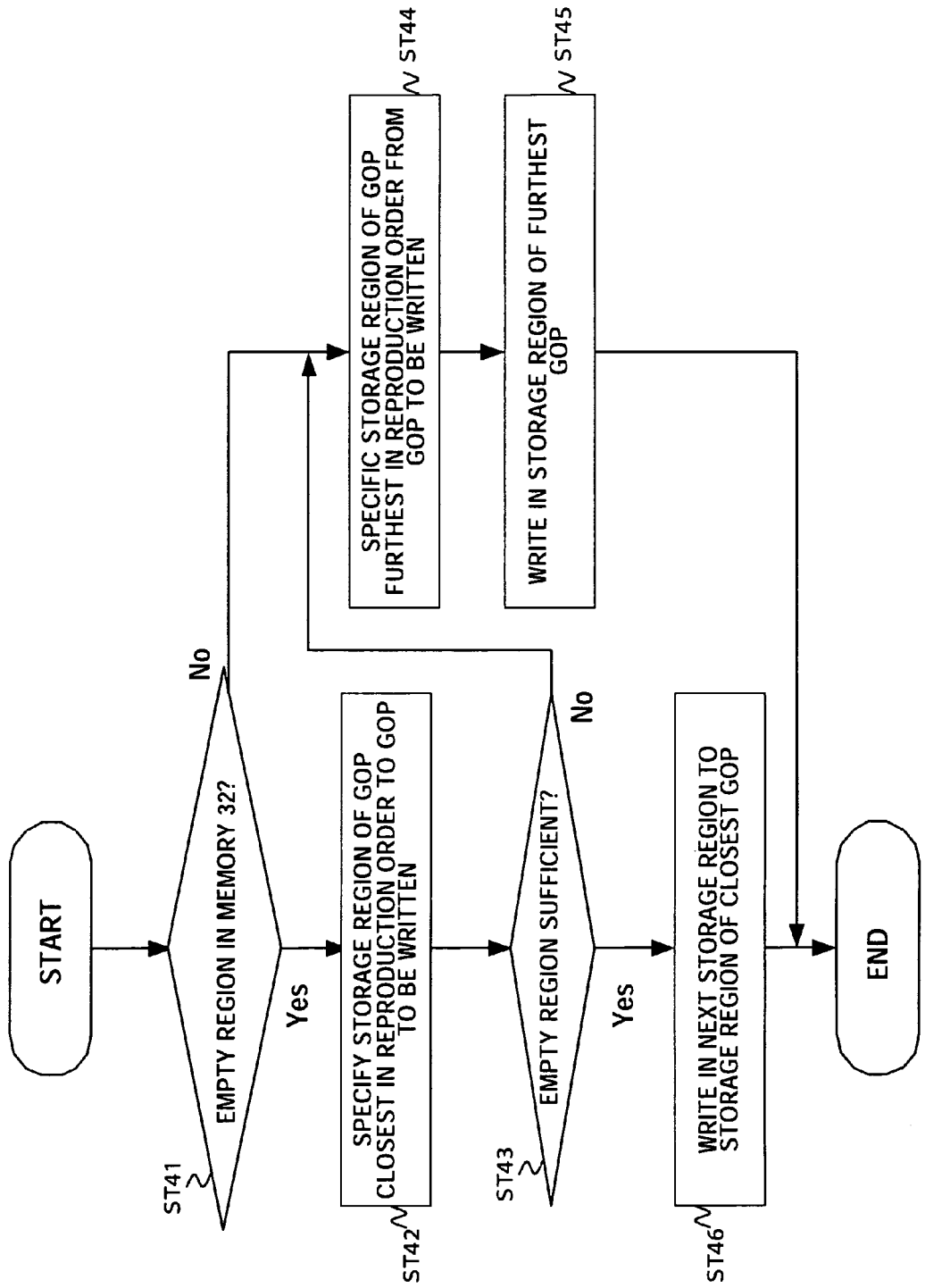
FIG. 7 is a flow chart for explaining the processing for determining the address for a computer to write a GOP in an input memory of a reproduction apparatus at step ST3 shown in FIG. 4, step ST20 shown in FIG. 5, and step ST34 shown in FIG. 6.

Below, the processing by which the CPU 20 of the computer 2 determines the addresses for writing the GOPs in the input memory 32 of the reproduction apparatus 4 at step ST3 shown in FIG. 4, step ST20 shown in FIG. 5, and step ST34 shown in FIG. 6 will be explained. FIG. 7 is a flow chart for explaining the address determination processing.

Step ST41:

The CPU 20 of the computer 2 judges whether there is an empty storage region in the input memory 32 for writing the GOP to be next written in the input memory 32 of the reproduction apparatus 4 for example based on storage management data obtained based on the above-mentioned transfer completion notifications. In the present embodiment, an "empty storage region" means a not yet used storage region in the input memory 32 or a storage region storing a GOP already finished being reproduced. When judging that there is an empty storage region, the CPU 20 proceeds to step ST42, while when judging there is not, it proceeds to step ST44.

Step ST42:

The CPU 20 of the computer 2 specifies the storage region in the input memory 32 in which the GOP closest in reproduction order to the GOP to be written next is stored among the GOPs stored in the input memory 32.

Step ST43:

The CPU 20 of the computer 2 judges if there is enough of an empty storage region for next writing the GOP in the storage regions adjoining the storage region specified at step ST42. When judging there is, it proceeds to step ST46, while when judging there is not, it proceeds to step ST44.

Step ST44:

The CPU 20 of the computer 2 specifies the storage region of the GOP furthest in reproduction order from the GOP to be written next among the GOPs stored in the input memory 32.

Step ST45:

The CPU 20 of the computer 2 controls the system so as to write the GOP to be next output to the reproduction apparatus at the storage region specified at step ST44.

Step ST46:

The CPU 20 of the computer 2 writes the GOP to be written next in an empty region adjoining the GOP next in reproduction order with respect to the GOP to be written among the GOPs stored in the input memory 32.

Figure 8A:
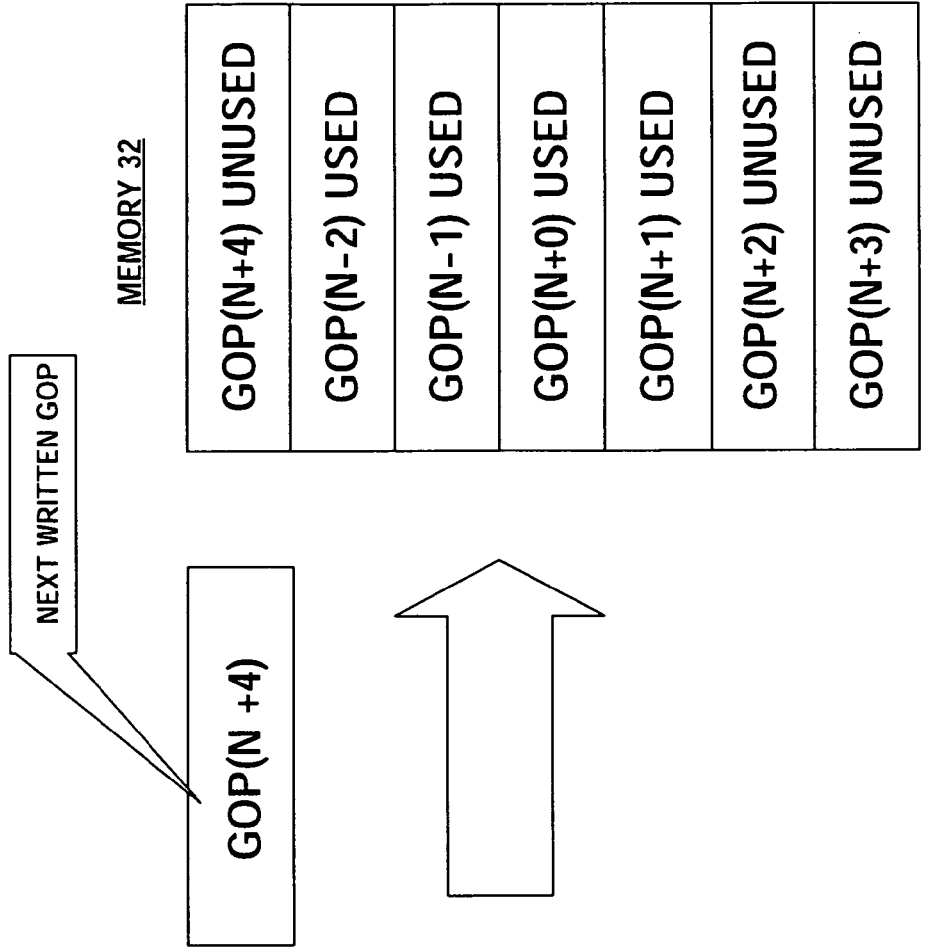
FIG. 8 is a view for explaining an example of the processing of FIG. 7.
Figure 8B:
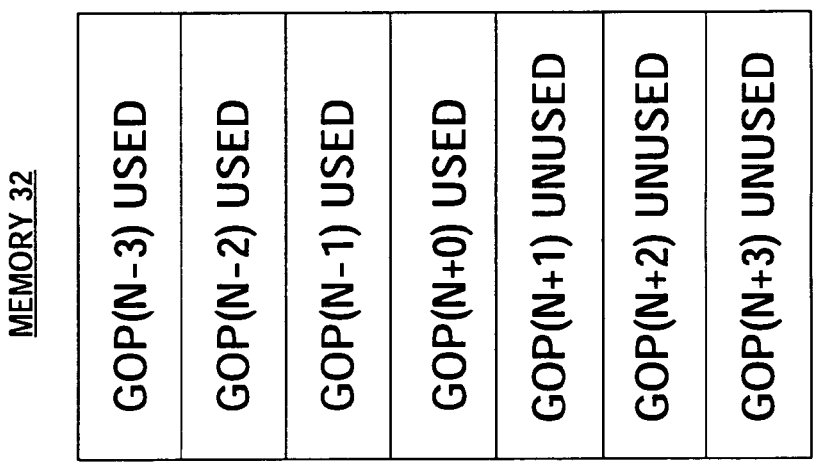

For example, when the input memory 32 has the storage state as shown in FIG. 8A, the CPU 20 of the computer 2 executes the processing of step ST44 and writes the GOP(N+4) to be output to the reproduction apparatus 4 over the GOP(N−3) in the input memory 32. Due to this, the state of storage in the input memory 32 becomes that as shown in FIG. 8B.

As explained above, in the data processing system 1, when a transient occurs, the computer 2 judges if the GOP including the picture data to be used next in reproduction in the reproduction direction after the transient is stored in the input memory 32 and outputs the GOP to the reproduction apparatus 4 conditional on judging that it is not stored there. Therefore, since a GOP already stored in the input memory 32 is not output from the computer 2 to the reproduction apparatus 4, the reproduction apparatus 4 can read and decode the picture data under processing from the input memory 32 without waiting for input of the GOP. As a result, it is possible to shorten the time from when a transient command is issued to when the reproduced output after the transient is obtained compared with the past.

The above effect is particularly remarkable when the picture data is of a high definition (HD) image or other image with a large amount of data or when employing a long GOP with a greater number of picture data in each GOP compared with a usual GOP. That is, when the picture data is of an HD image, the occurrence of a transient causes a large penalty in retransmission of picture data from the computer 2 to the reproduction apparatus 4. According to the data processing system 1, as explained above, when a transient occurs, the picture data reproduced and output immediately after it is held at the reproduction apparatus, so there is no need to transmit that picture data from the computer 2 to the reproduction apparatus 4. Further, with I, P, B, or other picture data using reference structures, a transient results in time being taken until all the picture data required for decoding next is assembled. This tendency becomes particularly great when employing a long GOP. In this embodiment, as explained above, the plurality of picture data required right after a transient is held at the reproduction apparatus 4, so there is no need to transmit the picture data right after a transient from the computer 2 to the reproduction apparatus 4.

Further, in the data processing system 1, the computer 2 manages the addresses in the input memory 32 at which GOPs output to the reproduction apparatus 4 have been written and the computer 2 controls the reproduction operation of the reproduction apparatus 4 based on this so can judge if the picture data required for reproduction at the reproduction apparatus 4 is stored in the input memory 32 without any notification from the reproduction apparatus 4. Due to this, it becomes possible to provide the picture data used for reproduction at the reproduction apparatus 4 to the reproduction apparatus 4 at an earlier timing.

Further, in the data processing system 1, as explained using FIG. 7, the computer 2 manages the system so that GOPs to be consecutively reproduced are stored in storage regions as close as possible in the input memory 32. Due to this, it is possible to read out the picture data to be decoded efficiently to the decoders 34_1, 34_2, and 34_3.

Second Embodiment

The second embodiment relates to the 10th to 14th aspects of the invention. A computer 2a corresponds to the data processing apparatus of the invention, while a reproduction apparatus 4a corresponds to a reproduction apparatus of the invention. As shown in FIG. 1, the data processing system 1a has for example the computer 2a and reproduction apparatus 4a. In the present embodiment, the CPU 20a of the computer 2a controls the overall progress of the decoding of the picture data at the reproduction apparatus 4a. When the CPU 42a of the reproduction apparatus 4a receives a transfer completion notification from the computer 2a, it makes the decoders 34_1 to 34_3 perform the decoding of the GOPs (picture data) specified by the transfer completion notification. Due to this, the CPU 42a does not require complicated management of the GOPs stored in the input memory 32 or scheduling of decoding of the GOPs and can be realized by a low processing capability processing circuit.

[Computer 2a:

As shown in FIG. 1, the computer 2a has an HDD 12, a bridge 14, a memory 16, a bridge 18, an operation device 19, and a CPU 20a. Note that the memory 16 stores a predetermined program PRG1a (program of the 11th aspect of the invention), while the CPU 20a reads and executes the program to perform the following processing. The predetermined program may be stored in a semiconductor memory or other memory 16 or may be stored on an HDD, optical disk, or other storage medium.

[Reproduction Apparatus 4a]

As shown in FIG. 1, the reproduction apparatus 4a has for example a PCI bridge 30, an input memory 32, decoders 34_1 to 34_3, reproduction memories 36_1 to 36_3, a selector 38, a control memory 40, a CPU 42a, and a control bus 46. Note that the control memory 40 stores a predetermined program. The CPU 42a reads and executes the program to perform the following processing. The predetermined program may be stored in a semiconductor memory or other control memory 40 or may be stored on an HDD, optical disk, or other storage medium.

Below, examples of the operation of the data processing system 1a will be explained.

[First Example of Operation]

Figure 9:
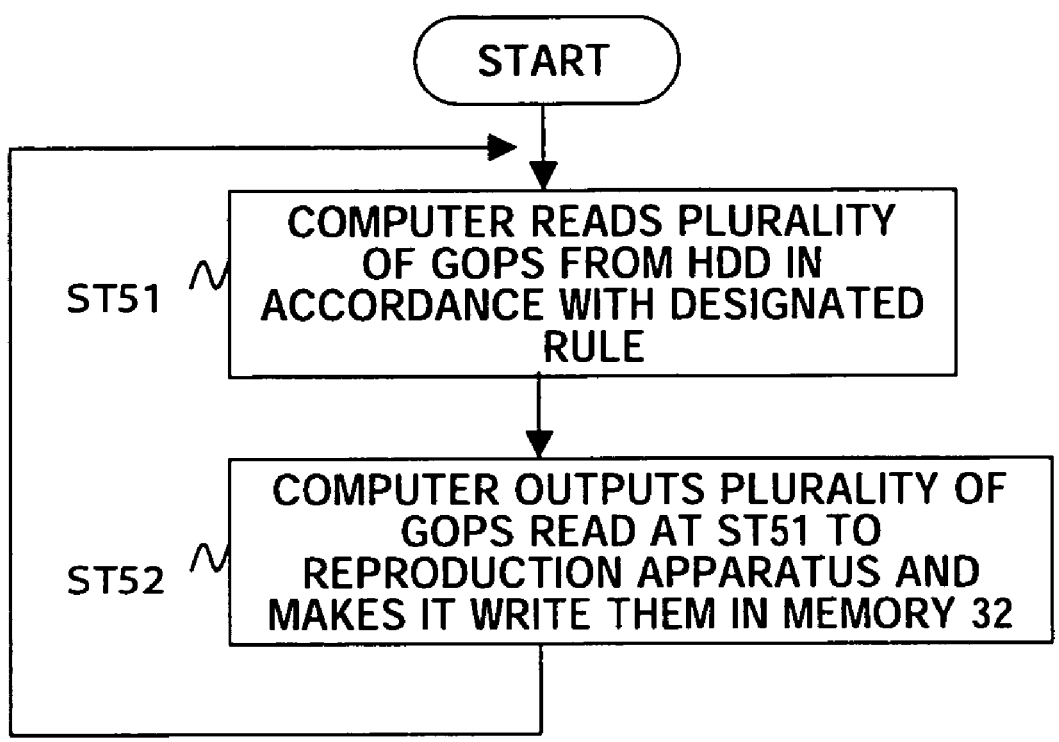
FIG. 9 is a flow chart for explaining the processing of the CPU of a computer in the case of the computer of the second embodiment of the present invention shown in FIG. 1 outputting picture data to a reproduction apparatus.

FIG. 9 is a flow chart for explaining the processing of the CPU 20a of the computer 2a in the case of outputting picture data from the computer 2a to the reproduction apparatus 4a in the embodiment shown in FIG. 1.

Step ST51:

The CPU 20a of the computer 2a reads for example a GOP including the picture data of a reproduction point designated by a predetermined rule and the GOPs before and after it, that is, a total of three (plurality of) GOPs, from the HDD 12.

Step ST52:

The CPU 20a of the computer 2a outputs the plurality of GOPs read at step ST51 through the bridge 18 and PCI bus 6 to the reproduction apparatus 4. The CPU 42a of the reproduction apparatus 4a writes the GOPs input from the computer 2a via the PCI bridge 30 into the input memory 32. At this time, the CPU 20a manages (designates) the addresses in the input memory 32 for writing the picture data output to the reproduction apparatus 4a. Note that the CPU 20a holds predetermined management data showing the addresses of the picture data stored in the input memory 32 of the reproduction apparatus 4a. The CPU 20a of the computer 2a does not output to the reproduction apparatus 4a a transfer completion notification right after output of the GOPs, but manages the reproduction timings of the picture data at the reproduction apparatus 4a and, based on the results of management, outputs to the reproduction apparatus 4 a transfer completion notification designating the picture data relating to the reproduction at the reproduction timing or right before.

[Second Example of Operation]

Figure 10:
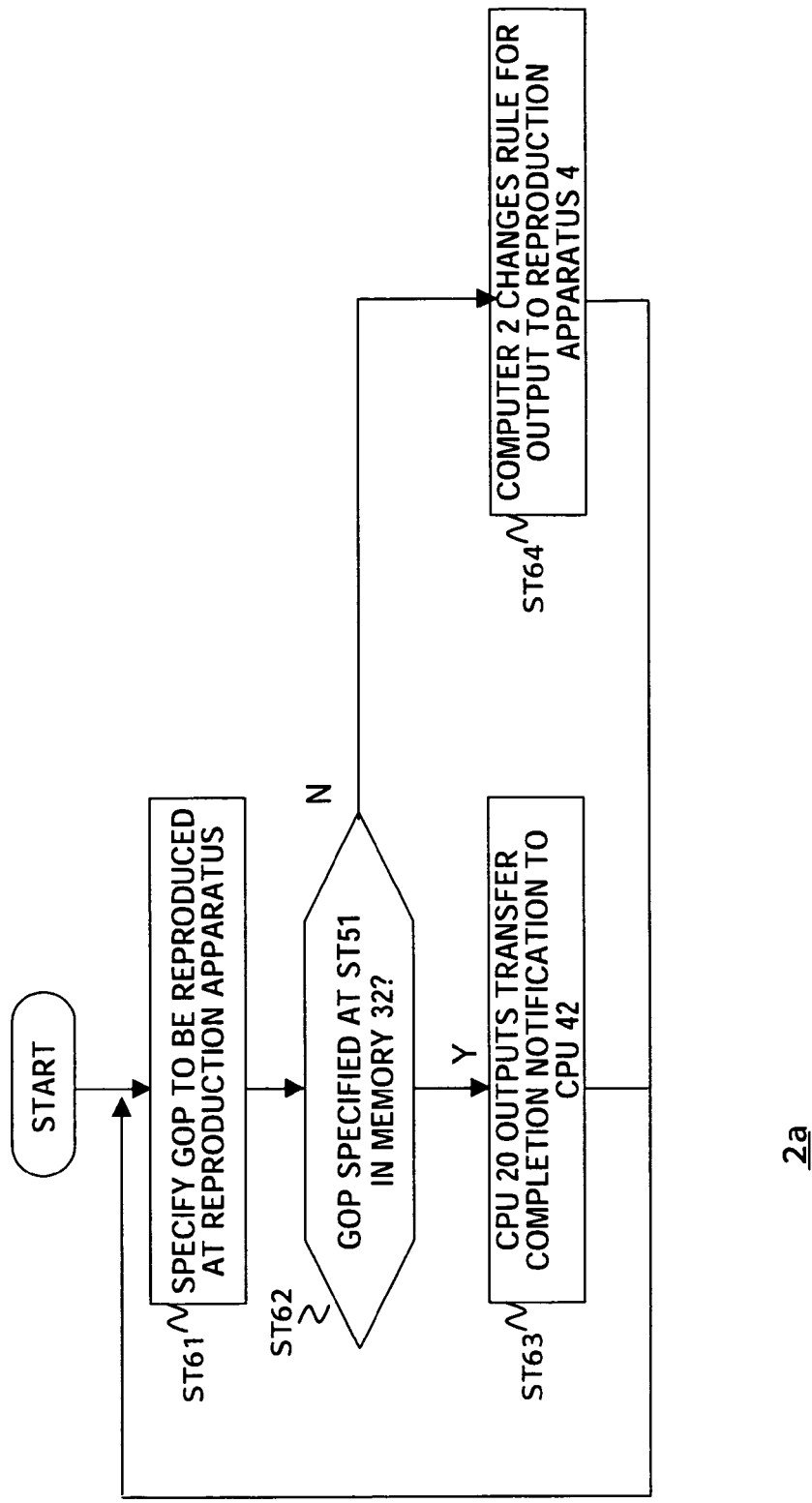
FIG. 10 is a flow chart for explaining control of reproduction of a reproduction apparatus by a computer of the second embodiment shown in FIG. 1.

FIG. 10 is a flow chart for explaining the control of the reproduction operation of the reproduction apparatus 4a by the computer 2a.

Step ST61:

The CPU 20a of the computer 2a for example manages the progress (timing) of reproduction of picture data at the reproduction apparatus 4a in accordance with operation of the operation device 19 by the user and specifies to the GOP to be reproduced at the reproduction apparatus 4a next or after a predetermined time.

Step ST62:

The CPU 20a of the computer 2a judges if the GOP specified at step ST61 is stored in the input memory 32 of the reproduction apparatus 4a. When judging it is stored, it proceeds to step ST63, while when judging it is not, it proceeds to step ST64.

Step ST63:

The CPU 20a of the computer 2a outputs a transfer completion notification indicating the address in the input memory 32 of the reproduction apparatus 4a storing the GOP specified at step ST61 to the reproduction apparatus 4a. The transfer completion notification shows, in addition to the address of the GOP specified at step ST61, the identification data and the size of the data of the GOP. Further, the transfer completion notification shows the identification data of each picture data in the output GOP, the address in the input memory 32 where the picture data is written, and the size of the picture data.

Step ST64:

The CPU 20a of the computer 2a rewrites the rule so as to output the GOP specified at step ST61 to the reproduction apparatus 4a. Due to this, when the CPU 20a of the computer 2a next executes step ST51 shown in FIG. 9, the GOP specified at step ST61 is output to the reproduction apparatus 4a. After this, the CPU 20a immediately outputs the transfer completion notification relating to the picture data to the reproduction apparatus 4a.

[Third Example of Operation]

Figure 11:
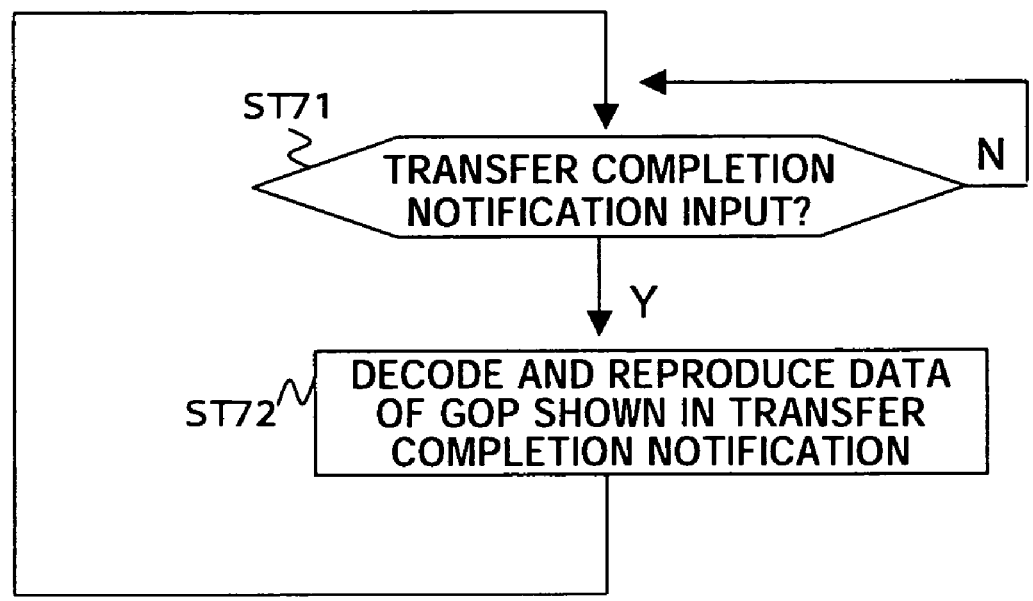
FIG. 11 is a flow chart for explaining the processing which a reproduction apparatus performs when receiving from a computer of the second embodiment of the present invention shown in FIG. 1 a transfer completion notification.

FIG. 11 is a flow chart for explaining the processing performed by the reproduction apparatus 4a receiving a transfer completion notification from the computer 2a.

Step ST71:

The CPU 42a of the reproduction apparatus 4a judges whether a transfer completion notification has been input via the PCI bridge 30. When judging it has been input, it proceeds to step ST72, while when it judges it has not, it repeats the judgment.

Step ST72:

The CPU 42a of the reproduction apparatus 4a reads the GOP (picture data) stored at the address in the input memory 32 shown by the transfer completion notification judged to have been input at step ST71 and outputs it to the decoders 34_1 to 34_3.

As explained above, in the data processing system 1a, when it is necessary for the computer 2a to transfer to the reproduction apparatus 4a the picture data in advance, the computer 2a outputs a transfer completion notification to the reproduction apparatus 4a. Therefore, the CPU 42a of the reproduction apparatus 4a need only detect that a transfer completion notification has been input from the computer 2a, then read the picture data (GOP) from the address in the input memory 32 indicated by the transfer completion notification and output it to the decoders 34_1 to 34_3. It is not necessary to constantly monitor the reproduction timing. Due to this, the CPU 42a can reduce the processing load accompanying reproduction processing compared with the first embodiment and can use an inexpensive processing circuit with a low processing capability.

That is, assume that when the data processing system 1a is for example reproducing the GOP(N) part, the user suddenly performs a scrub operation and tries to display the GOP(N+2) part. At this time, if assuming that the transfer up to GOP(N+2) has been completed, it is sufficient to output a transfer completion notification. Actual transfer is not required. Therefore, fast display is possible.

The above effect is particularly remarkable when the picture data is of a high definition (HD) image or other image with a large amount of data or when employing a long GOP with a greater number of picture data in each GOP compared with a usual GOP. That is, when the picture data is of an HD image, the occurrence of a transient causes a large penalty in retransmission of picture data from the computer 2a to the reproduction apparatus 4a. According to the data processing system 1a, as explained above, when a transient occurs, the picture data reproduced and output immediately after it is held at the reproduction apparatus, so there is no need to transmit that picture data from the computer 2a to the reproduction apparatus 4a. Further, with I, P, B, or other picture data using reference structures, a transient results in time being taken until all the picture data required for decoding next is assembled. This tendency becomes particularly great when employing a long GOP. In this embodiment, as explained above, the plurality of picture data required right after a transient is held at the reproduction apparatus 4a, so there is no need to transmit the picture data right after a transient from the computer 2a to the reproduction apparatus 4a.

Note that, like in the first embodiment, when simultaneously transferring several GOPs from the computer 2 to the reproduction apparatus 4 and sending a transfer completion notification, the CPU 20 and CPU 42 both have to manage the picture data stored in the input memory 32. As opposed to this, in the data processing system 1a, such management becomes unnecessary. This is effective when there is no extra leeway in the processing capability of the CPU 42a or when a scrub operation etc. cannot be scheduled, so the CPU 42a cannot process much.

The present invention is not limited to the above embodiments. That is, a person skilled in the art may made various changes to, form combinations or subcombinations of, or replace components of the embodiments within the technical scope of the present invention and the scope of their equivalents. In the above embodiments, further, as the plurality of picture data, MPEG picture data was illustrated, but the present invention may also be applied to audio data so long as it is decoded in order.

Figure 12:
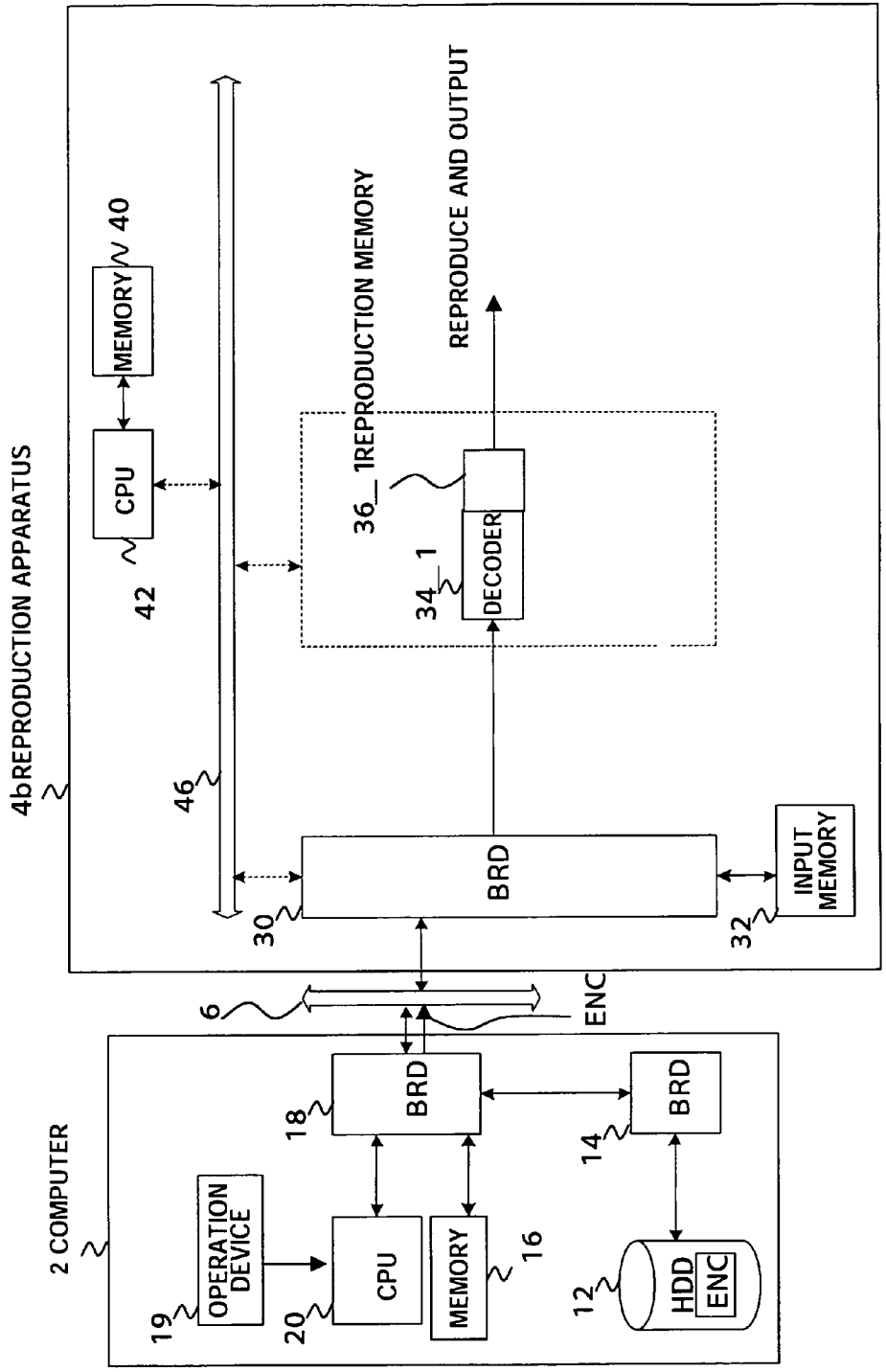
FIG. 12 is a view for explaining a modification of the data processing system according to the embodiments of the present invention.

Further, in the above embodiments, the case of use of a plurality of decoders was illustrated, but the present invention, for example, as shown in FIG. 12, may also be applied to the case where the reproduction apparatus 4b uses the single decoder 34_1. Further, in the above embodiments, as the encoding scheme, the MPEG was illustrated, but the invention may be similarly applied to the H.264/AVC (Advanced Video Coding) etc.

In the above embodiments, the case where compressed picture data was stored in the HDD 12 was explained, but the present invention is not limited to this, for example, can also be applied to storage through an input/output interface etc. on an optical disk, magneto-optic disk, semiconductor memory, magnetic disk, or other various storage media. Further, the mode of connection is not limited to connection through cables etc. For example, connection by other types of connection modes such as connection by wires or wirelessly from the outside is also possible. Further, in the above embodiments, the case of performing a series of processing by hardware having those functions was explained, but the present invention is not limited to this. Use of software for this is also possible. At this time, when performing a series of processing by software, various types of functions may be realized by installing various programs into the computer in which the program forming that software is built into to dedicated hardware. For example, it is installed in a general use personal computer etc. from for example a storage medium. Further, the storage medium for example includes an optical disk, magneto-optic disk, semiconductor memory, magnetic disk or other various storage media needless to say. Further, for example, it is also possible to install various types of programs in a general personal computer etc. for example by downloading them through the Internet or other networks.

Further, in the above embodiments, the steps describing the program stored in the storage medium may of course be performed in time sequence along the described order of course, but the invention is not limited in time sequence. Performance in parallel or individually is also included.

Further, the above embodiments, the reproduction speed is not particularly limited. The invention may be broadly applied to specific processing of the reproduction apparatus at any variable speed reproduction operations.

Further, the block configurations of the embodiments are examples of the block configurations. The invention is not limited to the illustrated examples.

Further, by suitable providing a group of read flags indicating if the data read from the HDD 12 is valid for the compressed and encoded data stored in the HDD 12, a group of decode flags indicating validity at the time of scheduling of decoding, a group of display flags indicating validity at scheduling for display of the decoded data, etc. as metadata and automatically updating the series of flag groups in accordance with reproduction speed and direction, scheduling can be managed. At this time, the past series of scheduling using variable speed reproduction processing and update information of the groups of flags may be managed as separate scheduling metadata (history information). This may in accordance with need be described as syntax in the compressed and encoded data or separately stored in a storage medium such as the HDD 12.

Further, the number of the decoders, the number of the banks, the decoder IDs, etc. may also be managed as metadata (component history information). Further, the reproduction speed, reproduction direction, etc. may also be managed as metadata (reproduction history information). At this time, the metadata may if necessary be described as syntax in the compressed and encoded data or separately stored in a storage medium such as the HDD 12. By referring to such metadata (history information), it is possible to reuse scheduling performed in the past and further to perform scheduling faster and more accurately. Note that this metadata may also be comprised so as to be managed at an outside apparatus as for example a database.

Note that, in the above embodiments, the present invention can also be applied to a case when the decoders 34-1 to 34-3 do not completely decode the compressed and encoded data stored on the HDD 12 (decode it up the middle). Specifically, for example, the present invention may also be applied to a case where the decoders 34_1 to 34_3 only perform decoding for variable length encoding and inverse quantization and do not perform inverse DCT, a case where they perform inverse quantization, but do not perform decoding for variable length encoding, etc. In such a case, for example, the decoders 34_1 to 34_3 may generate history information indicating for example up to what stage of encoding and decoding (for example, stage of inverse quantization) they performed processing for and output this linked with the incompletely decoded data.

Further, in the above embodiments, the HDD 12 stored incompletely encoded data (for example, data for which DCT and quantization were performed, but for which variable length encoding was not performed) and, in accordance with need, history information of the encoding and decoding, but the present invention may also be applied to the case where the decoders 34_1 to 34_3 can decode incompletely encoded data supplied under the control of the CPU 20 and convert it to a baseband signal. Specifically, the present invention can also be applied to the case where the decoders 34_1 to 34_3 for example perform inverse DCT and inverse quantization for data to which DCT and quantization have been applied, but variable length encoding has not been applied and do not perform decoding for variable length encoding. Further, in such a case, for example, the CPU 20 may obtain the history information of encoding and decoding stored in the HDD 12 linked with the incompletely encoded data and schedule the decoding by the decoders 34_1 to 34_3 based on that information.

Further, in the above embodiments, the HDD 12 stored the incompletely encoded data and, in accordance with need, history information of encoding and decoding, but the present invention may also be applied to the case where the decoders 34_1 to 34_3 do not completely decode the incompletely encoded data supplied under the control of the CPU 20 (decode it only to an intermediate stage). Further, in such a case as well, for example, the CPU 20 may obtain the history data of encoding and decoding stored in the HDD 12 linked with the incompletely encoded data and schedule the decoding by the decoders 34_1 to 34_3 based on this information. Further, in this case as well, the decoders 34_1 to 34_3 may generate history information of encoding and decoding in accordance with need and output it linked with the incompletely decoded data. In other words, the present invention may also be applied to the case where the decoders 34_1 to 34_3 perform partial decoding under the control of the CPU 20 (execute part of the steps of the decoding). The CPU 20 may obtain the history information of the encoding and decoding stored in the HDD 12 linked with the incompletely encoded data and schedule the decoding by the decoders 34_1 to 34_3 based on the information. The decoders 34_1 to 34_3 may also generate history information of encoding and decoding in accordance with need and output it linked with the incompletely encoded data.

Further, the HDD 12 may further store information on the history of encoding and decoding processing linked with the compressed and encoded stream data, and the CPU 20 may schedule the decoding of the compressed and encoded stream data based on the information on the history of the encoding processing and the decoding processing. Further, even when the decoder 34_1 to 34_3 can decode the compressed and encoded stream data and convert it to a baseband signal under the control of the CPU 20, it is possible to generate the information on the history of encoding and decoding in accordance with need and enable it to be output linked with the baseband signal.

Note that in the above embodiments, the reproduction apparatus 4 was explained as having a plurality of decoders, but the present invention can also be applied to the case of a single decoder. At this time, the single decoder may not only receive, decode, and display or output the compressed and encoded data, but may also, in the same way as explained above, receive the compressed and encoded data, partially decode it up to an intermediate stage, and output it to the outside along with history information of encoding and decoding, receive partially encoded data, decode it, and convert it to a baseband signal for output to the outside, or receive partially encoded data, partially decode it to an intermediate stage, and output it to the outside along with history information of the encoding and decoding.

Further, in the above embodiments, the CPU 20 and CPU 42 were configured separately, but the invention is not limited to this. For example, the CPU 20 and CPU 42 may also conceivably be configured by a single CPU controlling the reproduction apparatus 4 as a whole. Further, even when the CPU 20 and CPU 42 are configured independently, the CPU 20 and CPU 42 may also be formed on a single chip.

Further, when the CPU 20 and CPU 42 are configured independently, it is possible to make at least part of the processing performed by the CPU 20 in the above embodiments be performed for example by time division by the CPU 42 or to make at least part of the processing performed by the CPU 42 be performed by for example time division by the CPU 20. The CPU 20 and CPU 42 may also be realized using processors able to perform dispersed processing.

Further, for example, the reproduction apparatus 4 may be configured to be able to be connected to a network and, in the above embodiments, at least part of the processing performed by the CPU 20 or CPU 42 may be performed at the CPU of another apparatus connected through the network. Similarly, in the above embodiments, the memories 32, 40, etc. were configured separately, but the invention is not limited to this. These memories may conceivably also be configured by a single memory in the reproduction apparatus 4.

Further, in the above embodiments, the case of the HDD 12, the decoders 34_1 to 34_3, and the selector 38 being connected via bridges and buses and made integral as a reproduction apparatus was explained, but the present invention is not limited to this. For example, the invention may also be applied to the case where part of these components are connected by wires or wirelessly from the outside and the case where these components are connected to each other in other various modes of connection.

Further, in the above embodiments, the case of the compressed stream data being stored in an HDD was explained, but the present invention is not limited to this. For example, the invention may also be applied to the case of reproducing and processing stream data stored on an optical disk, magneto-optic disk, semiconductor memory, magnetic disk, or other various storage media.

Further, in the above embodiments, the CPU 42, memory 32, memory 40, decoders 34_1 to 34_3, and the selector 38 were mounted on the same expansion card (for example, PCI card or PCI-Express card), but the invention is not limited to this. For example, PCI-Express or other technology may be used to mount these components on separate expansion cards when the speed of transfer between cards is high.

Further, in this specification, a "system" means a logical collection of a plurality of apparatuses. It does not matter if the apparatuses of the different configurations are in the same housing or not.

The present invention may be applied to a system for reproducing reproduced data.

It should be understood by those skilled in the art that various modifications, combinations, sub-combinations, and alterations may occur depending on design requirements and other factors insofar as they are within the scope of the appended claims or the equivalents thereof.

What we claim is:

1. A data processing apparatus configured to output picture data to a reproduction apparatus configured to reproduce a plurality of picture data, the data processing apparatus comprising:

a processing circuit configured to output, to said reproduction apparatus, said picture data in an order in accordance with a reproduction direction designated at said reproduction apparatus, to designate an address in an input memory at which said picture data output to said reproduction apparatus is to be written, to output an address notification that indicates said address to said reproduction apparatus, and to manage said picture data stored in said input memory based on commands output to said reproduction apparatus including a command to reverse said reproduction direction at said reproduction apparatus; and if said reproduction direction designated at said reproduction apparatus is reversed by a command output by said processing circuit to said reproduction apparatus, said processing circuit is configured to judge whether said picture data to be used next in reproduction in said reproduction direction after reversal is stored in said input memory, and to output said picture data to be used next in reproduction in said reproduction direction after reversal to said reproduction apparatus conditional on said picture data to be used next in reproduction by said reproduction direction after reversal being judged as not being stored in said input memory.

2. The data processing apparatus as set forth in claim 1, wherein said processing circuit is configured to output said picture data to be used next in a unit of a group of picture data including the plurality of picture data to the reproduction apparatus if said group of picture data to be used next in reproduction in said reproduction direction after reversal is determined not to be stored in said input memory.

3. The data processing apparatus as set forth in claim 2, wherein said processing circuit is configured to output, to said reproduction apparatus, a new group of picture data corresponding to said reproduction direction designated at said reproduction apparatus each time said reproduction apparatus ends reproduction of all of said picture data included in said group of picture data.

4. The data processing apparatus as set forth in claim 1, wherein, if said picture data to be used for reproduction in the reproduction direction after reversal is determined to be stored in said input memory, said processing circuit is configured to output said address notification indicating the address of said input memory at which said picture data is stored to said reproduction apparatus.

5. The data processing apparatus as set forth in claim 1, wherein said processing circuit is configured to output, to said reproduction apparatus, an address notification indicating an address of an unused storage region adjoining a storage region storing picture data closest in reproduction order to said picture data to be used next in reproduction by said reproduction direction after reversal.

6. A data processing system comprising:

a data processing apparatus configured to output a plurality of picture data to a reproduction apparatus in an order in accordance with a reproduction direction designated at said reproduction apparatus, to designate an address in an input memory at which said picture data output to said reproduction apparatus is to be written, to output an address notification that indicates said address to said reproduction apparatus, and to manage said picture data stored in said input memory based on commands output to said reproduction apparatus including a command to reverse said reproduction direction at said reproduction apparatus, and if said reproduction direction designated at said reproduction apparatus is reversed by a command output by said processing circuit to said reproduction apparatus, said processing circuit is configured to judge whether said picture data to be used next in reproduction in said reproduction direction after reversal is stored in said input memory, and to output said picture data to be used next in reproduction in said reproduction direction after reversal to said reproduction apparatus conditional on said picture data to be used next in reproduction by said reproduction direction after reversal being judged as not being stored in said input memory; and the reproduction apparatus configured to write said picture data input from said data processing apparatus into said input memory and to reproduce said picture data read from said input memory in accordance with the reproduction direction.

7. A program on a non-transitory computer readable storage medium executed by a data processing apparatus that outputs a plurality of picture data to a reproduction apparatus reproducing the plurality of picture data an comprising:

a first routine of outputting, to said reproduction apparatus, said picture data in an order in accordance with a reproduction direction designated at said reproduction apparatus;

a second routine of designating an address in an input memory at which said picture data output to said reproduction apparatus is to be written a third routine of outputting an address notification that indicates said address to said reproduction apparatus a fourth routine of managing said picture data stored in said input memory based on commands output to said reproduction apparatus including a command to reverse said reproduction direction at said reproduction apparatus;

a fifth routine of, if said reproduction direction designated at said reproduction apparatus is reversed by a command output by said processing apparatus to said reproduction apparatus, judging whether said picture data to be used next in reproduction in said reproduction direction after reversal is stored in said input memory, and outputting said picture data to be used next in reproduction in said reproduction direction after reversal to said reproduction apparatus conditional on said picture data to be used next in reproduction in said reproduction direction after reversal being judged as not being stored in said input memory.

8. A non-transitory computer readable storage medium encoded with instructions, which when executed by a data processing apparatus outputting a plurality of picture data to a reproduction apparatus reproducing the plurality of picture data, causes said data processing apparatus to execute a method comprising:

outputting, to said reproduction apparatus, said picture data in an order in accordance with a reproduction direction designated at said reproduction apparatus;

designating an address in an input memory at which said picture data output to said reproduction apparatus is to be written outputting an address notification that indicates said address to said reproduction apparatus managing said picture data stored in said input memory based on commands output to said reproduction apparatus including a command to reverse said reproduction direction at said reproduction apparatus;

if said reproduction direction designated at said reproduction apparatus is reversed by a command output by said processing apparatus to said reproduction apparatus, judging whether said picture data to be used next in reproduction in said reproduction direction after reversal is stored in said input memory, and outputting said picture data to be used next in reproduction in said reproduction direction after reversal to said reproduction apparatus conditional on said picture data to be used next in reproduction in said reproduction direction after reversal judged as not being stored in said input memory.

9. A data processing apparatus configured to output a plurality of picture data, said data processing apparatus comprising:

means for outputting, to a reproducing unit, said picture data in an order in accordance with a reproduction direction designated at said reproducing unit;

means for designating an address in an input memory at which said picture data output to said reproducing unit is to be written;

means for outputting an address notification that indicates said address to said reproducing unit;

means for managing said picture data stored in said input memory based on commands output to said reproducing unit including a command to reverse said reproduction direction at said reproducing unit;

if said reproduction direction designated at said reproducing unit is reversed, means for judging judges whether said picture data to be used next in reproduction in said reproduction direction after reversal is stored in said input memory, and means for outputting outputs said picture data to be used next in reproduction in said reproduction direction after reversal to said reproducing unit conditional on said picture data to be used next in reproduction by said reproduction direction after reversal being judged as not being stored in said input memory; and the reproducing unit configured to write said picture data input from said data processing unit into said input memory and to reproduce said picture data read from said input memory in accordance with the reproduction direction designated by said data processing unit.

10. The data processing apparatus of claim 1, wherein the picture data are high definition images.

11. The data processing system of claim 6, wherein the picture data are high definition images.

12. The program on a non-transitory computer readable storage medium of claim 7, wherein the picture data are high definition images.

13. The non-transitory computer readable storage medium of claim 8, wherein the picture data are high definition images.

14. The data processing apparatus of claim 9, wherein the picture data are high definition images.

15. The data processing apparatus of claim 1, further comprising a memory device that stores programs and data used by the processing circuit.

* * * * *